June 16, 1936.    S. E. HILBLOM    2,044,169
TRACTOR MOWER
Filed Oct. 14, 1935    4 Sheets-Sheet 1

Inventor
Samuel E. Hilblom
By V. F. Laisagne
Atty.

June 16, 1936.    S. E. HILBLOM    2,044,169
TRACTOR MOWER
Filed Oct. 14, 1935    4 Sheets-Sheet 2

Inventor
Samuel E. Hilblom
By V. F. Lassagne
Atty.

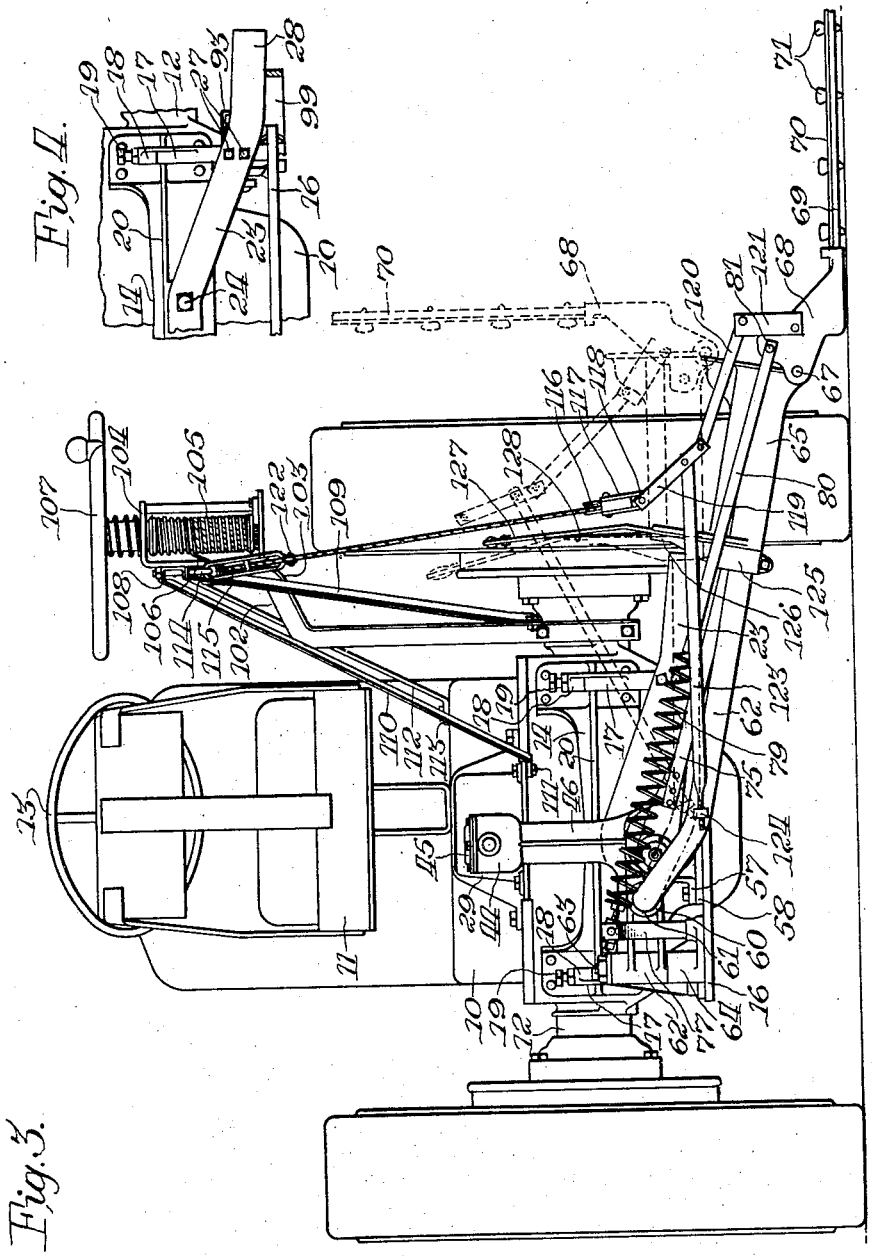

June 16, 1936.  S. E. HILBLOM  2,044,169
TRACTOR MOWER
Filed Oct. 14, 1935    4 Sheets-Sheet 4
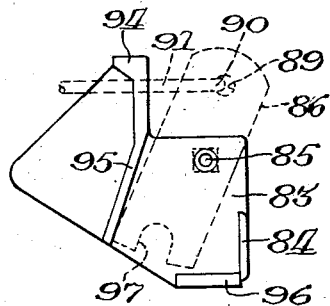
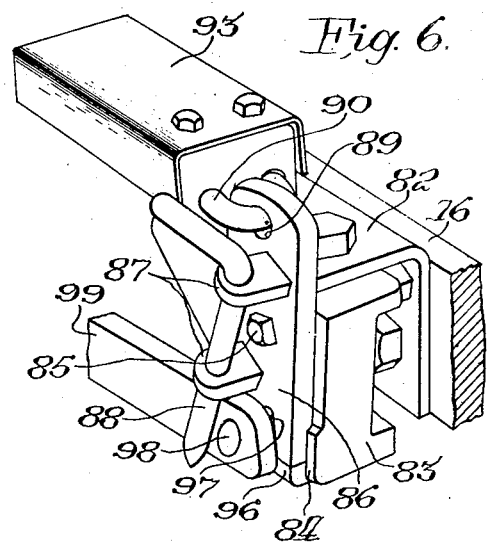
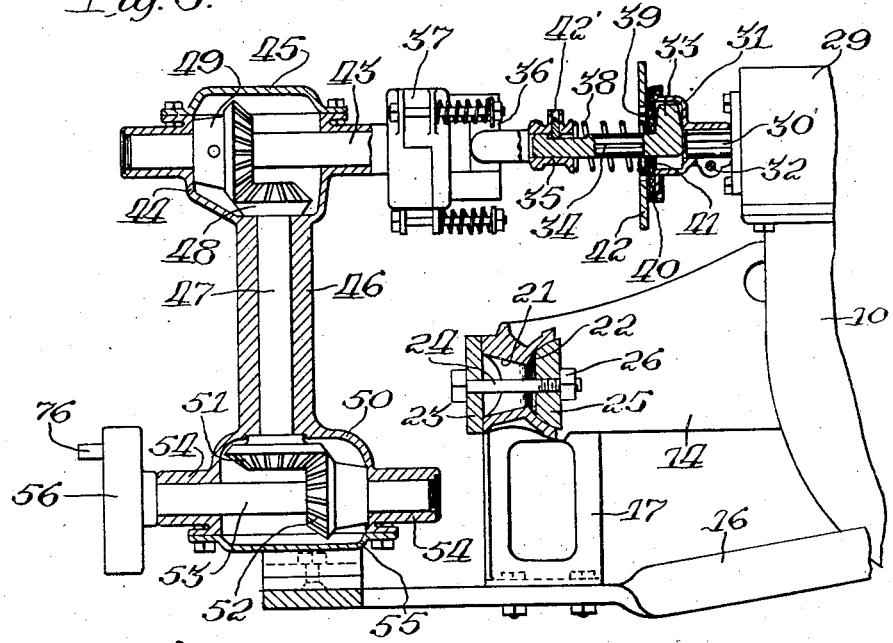
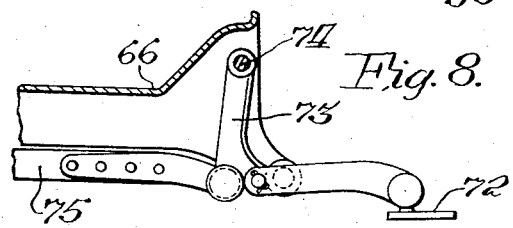
Inventor
Samuel E. Hilblom
By V. F. Lassagne
Atty.

Patented June 16, 1936

2,044,169

UNITED STATES PATENT OFFICE 2,044,169

TRACTOR MOWER

Samuel E. Hilblom, Chicago, Ill., assignor to International Harvester Company, a corporation of New Jersey Application October 14, 1935, Serial No. 44,912

15 Claims. (Cl. 56—25)

The invention relates to tractor mowers of the rear connected type.

The primary object of the invention is to provide an improved structure for connecting a mower attachment to the rear end of the tractor.

Another important object is to provide an improved gag-bar and mounting therefor associated with the means that connects the mower to the tractor, said gag-bar serving to facilitate hinging of the mower cutter-bar to an absolute or vertical lift position.

Still another important object is to provide an improved mounting for carrying a windlass and cable lift means for the cutter-bar on a wheel type tractor.

Another desirable object is to provide an improved arrangement of driving gears for operating the cutting mechanism of the mower by power derived from a rear power take-off shaft on the tractor.

Other important objects of the invention will be apparent to those skilled in this art as the disclosure is more fully made.

In the practicable embodiment of the invention herein chosen for purposes of the disclosure there is provided a wheel tractor having a draw-bar and power take-off shaft at its rear end. The draw-bar carries a novel mount for carrying an improved gag-bar and for mounting a support to which a mower attachment of the obstruction release type is connected. This support carries a releasable member mounting a gear box of improved form, the box containing gearing driven from the tractor power take-off shaft for operating the cutting apparatus of the mower. The cutter-bar is hingedly associated with the mower structure for upward hinging movement to an absolute, or vertical lift, position, such adjustment of the bar being effected by a windlass and cable unit mounted on the tractor in an improved manner to make the same accessible for operation by an operator located on a seat at the rear of the tractor.

In the accompanying sheets of drawings illustrating the improved tractor mower structure;

Figure 3 is a rear elevational view of the tractor mower connected to the tractor;

Figure 4 is a detail, fragmentary, rear elevational view showing the improved gag-bar with the coupling link contacting the same as it would be when the cutter-bar hinges to its vertical lift position of adjustment;

Figure 5 is a side view, partly in section, through the driving mechanism between the tractor and the mower taken along the line 5—5 of Figure 1, looking in the direction of the arrows;

Figure 6 is a detail, perspective view on an enlarged scale showing the mechanism by which the coupling link is releasably connected to a fixed point on the tractor;

Figure 7 is a detail side elevational view of a portion of the structure shown in Figure 6; and, Figure 8 is a detail view, partly in section, transversely through the mower coupling yoke, looking from the rear and showing the drive connections from the pitman to the knife for reciprocating the latter.

Figure 1:
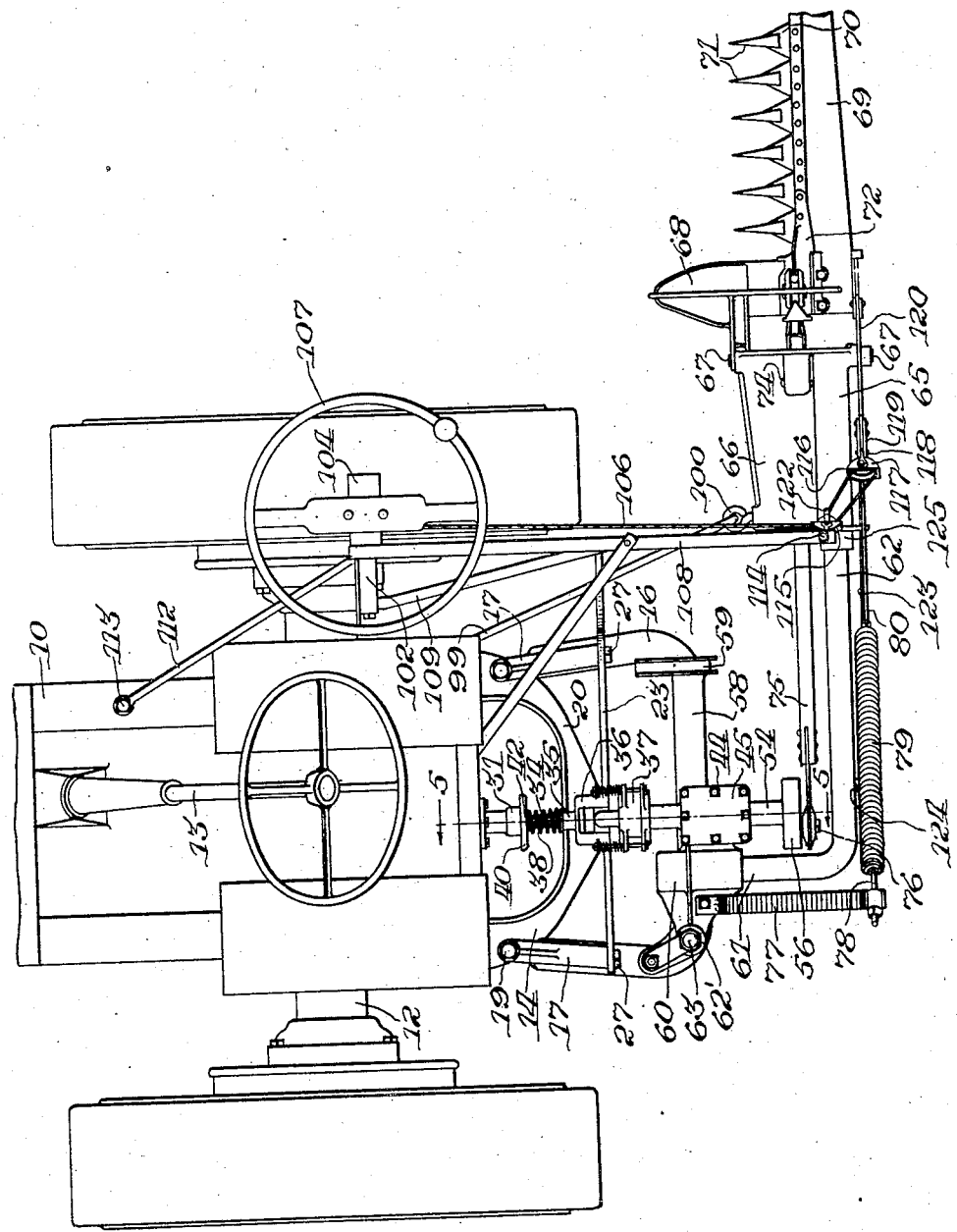
Figure 1 is a general plan view of the rear end of a wheel tractor showing the mower attachment operatively associated with the rear end thereof.
Figure 2:
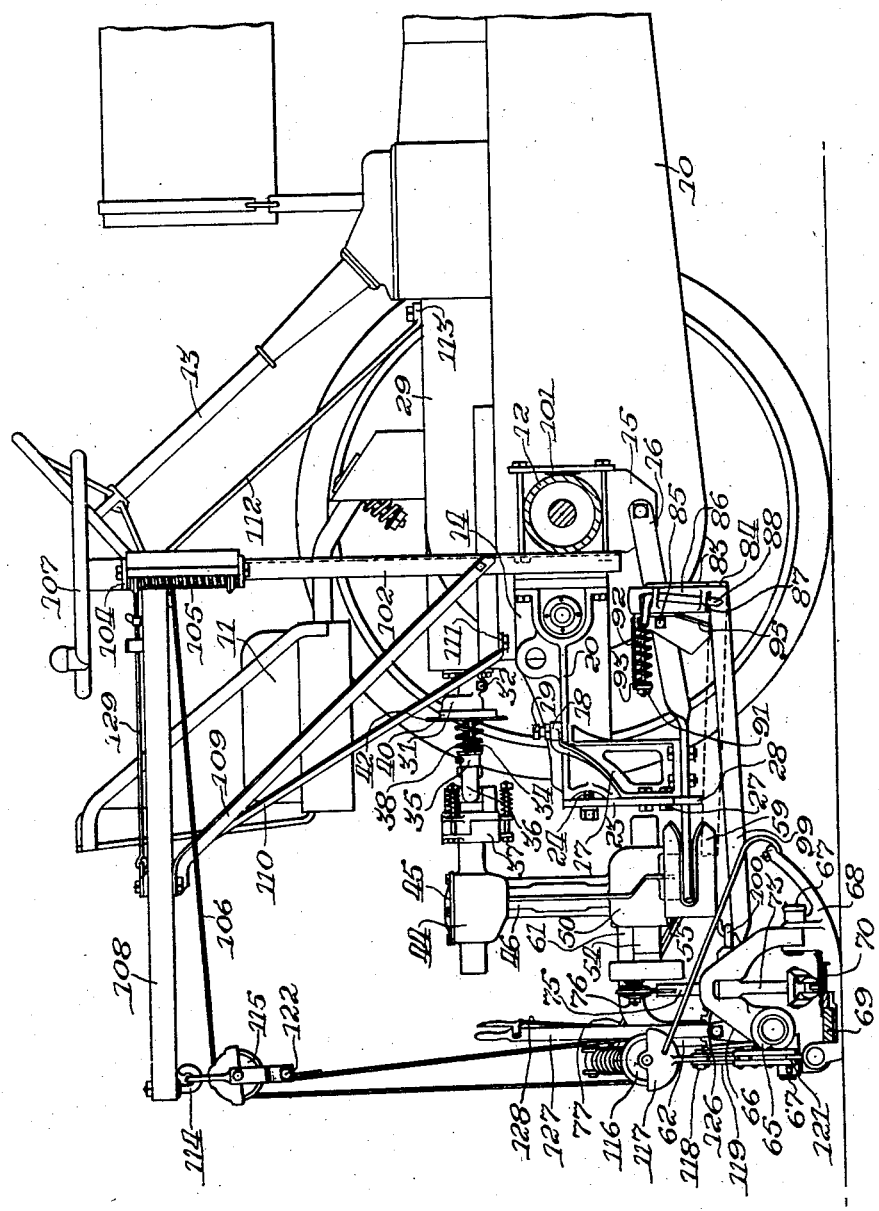
Figure 2 is a side elevational view of the tractor mower structure shown in Figure 1, viewed from the grassward side.

As shown in Figure 1 the tractor illustrated is preferably of the wheel type embodying a central longitudinal body 10 carrying at its rear end an operator's seat 11, said body being carried on a transverse rear axle housing structure 12. A steering control for the tractor is indicated at 13 in a position on the body forwardly of the seat 11. The rear axle housing 12 carries a rearwardly extending U-shaped draw-bar 14, as shown in Figures 1 and 2, and on opposite sides thereof the axle housing 12 carries depending brackets 15. Bolted to these depending brackets 12 is a U-shaped support 16, the bight of which extends transversely some distance rearwardly of and below the draw-bar 14.

As shown also in Figure 5, the legs of the U-support 16 have bolted thereto upstanding brackets 17, which at their upper ends are formed with slotted bosses 18 to receive set screws 19 for clamping the upper ends of each bracket 17 to a flange 20 formed on the draw-bar 14. As shown in Figures 2 and 5, the draw-bar 14 is formed intermediately of its end with a socket 21 having a spherical depression 22 to receive the usual pintle draw-bar hook, not shown, when the tractor is used for drawing a plow, for instance, or an implement other than the tractor mower attachment herein shown. This pintle hook socket 21, 22 is utilized when the tractor mower is to be attached to the tractor for rigidly mounting in place a transverse gag-bar shown at 23, said gag-bar intermediately of its ends being connected by a bolt 24 passed through the opening 21. By means of a spherical block 25 this bolt 24 can be fastened securely with a nut 26 in the socket 21 to hold the gag-bar 23 rigidly in place. This gag-bar has its ends secured by bolts 27 to the respective brackets 17 heretofore described, the grassward end of said gag-bar 23 being bent downwardly, as shown in Figures 3 and 4, so that it has a grassward extension 28 projecting laterally to one side of the grassward bracket 17 and support, as best shown in Figure 4.

The body of the tractor 10 carries a housing 29 from which protrudes, as shown in Figure 5, the rear end of a conventional power take-off shaft 30. This power take-off shaft is splined and receives a bell-shaped collar 31 made fast to the spline on the shaft 30 by a pinch-bind connection 32. The rear end of the bell-shaped member 31 is open to receive the drive prong end 33 of a splined shaft 34, which shaft 34 has its rear end slidably and telescopically fitted into the extension 35 of a universal joint yoke 36, which is part of a release clutch 37. The front end of the portion 35 has abutting thereagainst a coil spring 38 encircling the shaft 34, the forward end of said spring being arranged to abut against a cup-shaped washer 39, which is part of a cup-shaped disk 40 that partly surrounds the bell housing 31, there being a packing 41 between the parts to exclude dirt and provide a seal. The part 40 has fastened thereto suitable spokes or arms 42 which can be grasped by an operator in compressing the spring 38 and for removing the shaft 34 rearwardly endwise into the socket portion 35 for disconnecting the driving head 33 from the bell housing 31, to disconnect the shaft 34 from the power take-off shaft 30. A detent pin 42', carried by the member 35, fits down into a notch in the shaft 34 to prevent the spring 38 from accidentally pulling the shaft 34 all the way out of the part 35. In other words, the pin 42', engaging in the end of notch of the shaft 34, limits the outward movement of the shaft 34 under the pressure exerted by the spring 38.

The release clutch 37 drives a shaft 43 in longitudinal alignment with the power take-off shaft 30, said shaft 43 being journaled in a housing 44, closed at its upper end by a removable cap 45. This housing 44 constitutes an enlarged box portion at the upper end of a vertical shaft mount 46 integrally formed with the box 44, said mount 46 enclosing a shaft 47 having at its upper end a bevel gear 48 driven from a bevel pinion 49 made fast on the shaft 43, said bevel gears 48, 49 being located within the enlarged housing portion 44. The lower end of the housing part 46 includes a lower box portion or enlargement 50 of the housing, within which housing the shaft 47 carries at its lower end a bevel gear 51 in mesh with and driving a bevel gear 52 on a shaft 53 located below the shaft 43 and in substantial parallelism therewith, the housing enlargement 50 including bearing sleeves 54 for journaling the shaft 53, and the gears 51, 52 being enclosed in said enlarged lower housing 50. The lower end of this housing portion 50 is closed by a cap 55, which is removable to gain access to the gears. The rear end of the shaft 53 extends out of the housing 50 where it carries and drives a flywheel 56.

As shown in Figure 3, the integral housing 44, 46, 50 at its lower end is formed with a flange 57 at each side thereof which is securely bolted to a plate 58 lying on the transverse bight of the U-support 16; in other words, this gear housing at its lower end is securely bolted to said plate 58. The grassward end of this plate 58, as shown in Figure 2, has connected to it a U-shaped guide bracket 59 which embraces slidably and fits around the support 16, as clearly shown in Figure 2. The stubbleward end of the lower housing 50, as shown in Figure 3, has an integrally cast extension 60, which is bored out to form a socket for rockably receiving the bent end of a coupling arm 61, said arm, as at 62, extending parallel with the plate 58. This socket casting 60 includes a vertical socket extension 62' journaled for turning movement on a vertical pivot bolt 63 and carried in a bracket 64 mounted on the stubbleward end of the transverse bight portion of the U-support 16.

The grassward end of the coupling arm 62 rockably carries in a conventional manner the sleeve 65 of a coupling yoke 66. Connected by horizontally aligned hinge pins 67 to the yoke 66 is a conventional mower shoe 68, which carries the cutter-bar 69.

The cutter-bar 69 in the usual way carries a knife or sickle 70 reciprocable between finger guards 71 mounted on the bar 69, the inner end of said knife 70 carrying a knife-head 72, which has connection with a pendant link or crank 73 pivotally mounted at 74 in the coupling yoke 66. The lower end of the pendant pivot link 73 is connected, as shown in Figure 7, to a pitman 75 which in turn is connected to a wrist-pin 76 on the fly-wheel 56.

The bracket 60 carries an upwardly and rearwardly extending support 77 in which is mounted an eye-bolt 78 for adjustably mounting a counterbalancing spring 79, which is connected by means of a link 80 to the shoe 68 at 81.

As shown in Figures 2 and 6, the front end of the grassward leg of the U-support 16 has bolted to it an angle piece 82, inside of which is secured a stationary bracket 83 having a shoulder 84 (see also Figure 7). Pivotally mounted to the side of the bracket 83 by means of a bolt 85 is an arm 86 carrying a pair of eye bosses 87, through which extends a pin 88. The end of the lever 86 above the pivot bolt 85 has an eye 89 in which is placed a hook 90 of a bolt 91, which bolt is surrounded by a spring 92 locked in compression within a housing 93. The bolt 91 guides through an upward extension 94 on the bracket 83, as shown in Figure 7, this extension 94 terminating at its lower end limit stop flange 95.

The lower end of the bracket 83 includes a ledge or shoulder 96, on which the lower end of the lever 86 normally rests, the lower end of said lever being notched, as at 97, to receive a transverse pin 98 mounted in and extending laterally from the forward end of a coupling link 99, which at its rear end is formed for connection to an eye 100 carried on the front side of the coupling yoke 66.

The grassward end of the rear axle housing 12 of the tractor, by means of a bolt clamp structure 101, carries an upstanding standard 102, which, as shown in Figure 3, extends upwardly to a point adjacent the seat 11 and then is bent outwardly, as at 103, and then upwardly again to be spaced at proper arm length distance from the seat 11. Bolted to the upper end of the standard 102 is a channel-shaped bracket 104, which carries a windlass 105, around which is reeled a flexible element, such as a cable, 106. This windlass may be manually operated by a hand controlled wheel 107 after the fashion shown and claimed in the patent to Pearson 1,973,993 issued September 18, 1934. This windlass per se forms no part of the present invention, but the adaptation in mounting thereof for a wheel type tractor is believed herein to be novel. The channel piece 104 carries a rearwardly extending channel beam 108 which is connected by a brace 109 to the lower end of the standard 102, said channel 108 further being supported and braced by means of a brace 110 connected at 111 to the body of the tractor. Further, a forwardly extending brace 112 braces and supports the windlass structure at a forward point 113 on the body of the tractor.

The rear end of the channel beam 108 carries a hook 114, from which is suspended a pulley 115 carried in a suitable block. The cable 106 extends from the windlass 105 around said pulley 115 and then downwardly around a pulley 116 carried in a block 117 pivotally connected, as shown in Figure 3, at 118 to a link 119, which link in turn is connected to a link 120, the latter link in turn being pivoted to an arm 121 carried by the shoe 68. The cable 106, after passing around the pulley 116, extends upwardly and is dead-ended at 122 to the block for the pulley 115, as shown in Figure 2. A link 123 connects between the link 119 and a boss 124 adjacent the stubbleward end of the coupling arm 62.

Securely fastened to the coupling arm 62 is a bracket 125 formed at its upper end with a notched quadrant 126, and secured to the coupling yoke sleeve 65 for rocking the same is a hand lever 127 having the usual detent mechanism 128 for locking the lever to the notched quadrant 126. This lever 127, when moved fore and aft, serves to rock the sleeve 65 and the yoke 66 to tilt the shoe 68 and cutter-bar 69 to change the inclination of the guards 71 and cutting apparatus 70 with respect to the ground.

In use and operation the tractor mower is connected to the tractor in the manner that has been shown and described with the cutter-bar 69 extending laterally of the rear end of the tractor in its cutting position. The coupling link 99 has its pin 98 locked in the notch 97 of the lever 86 and the spring 92 pulls the lower end of the lever 86 in a forward direction against the shoulder 84 with the pin 98 disposed over the lip 96, so that the coupling link 99 cannot drop downwardly and free itself from the lever 86. The pin 88 passed through the boss 87 and along one side of the link 99 prevents lateral escape of the link from the lever 86. In normal operation of the mower when pulled by the tractor, the spring 92 is sufficiently strong to hold the mower in its normal cutting position, making the pivot 63, which is the other point of connection of the mower to the tractor, inoperative. Should the mower encounter an obstruction with sufficient force to overcome the force of the spring 92, the link 99 will transmit a pull on the lower end of the lever 86 to cause it to pivot at its lower end rearwardly to such an extent that the pin 98 rides off the lip 96. At this time the pin 98 will fall by gravity out of the notch 97 at a point shown in Figure 7, when the lever 86 has its lower end disposed rearwardly against the limit stop 95. With the coupling link 99 thus freed, the entire mower structure, including the cutter-bar 69, coupling arm 62, bracket 60, and plate 58, swings rearwardly about the pivot bolt 63 relative to the support 16 to save the mower from damage. As the gear housing 44, 46, 50 is mounted on the plate 58 as part of the mower structure, it also swings back, so that the driving element 33 simply pulls out of the bell housing 31 to disconnect the shaft 34 from its driving connection with the housing 31 and the power take-off shaft 30. Thus, continued operation of the pitman 75 ceases when the cutter-bar 69 is obstruction released to stop the drive of the knife 70. When this occurs, the cable 106 merely reels out from the windlass 105, as in the Pearson Patent 1,973,993 mentioned. The cable 106 may be used to pull the cutter-bar 69 back to its normal cutting position by operating the hand wheel 107, as described in said Pearson patent. The drive connection with the power take-off shaft housing must, however be recoupled by hand, and this is also true of restoring the coupling link 99 to its locked position with the lever 86, as shown in Figure 6.

When it is desired to lift the cutter-bar 69 from its normal cutting position about the hinges 67 to the vertical or absolute lift position shown in dotted lines in Figure 3 for the purpose of transporting the outfit or passing an obstruction, the windlass 105 is turned in the manner described in the previously mentioned Pearson patent by the hand wheel 107 to reel up the cable 106, causing a lifting action of the block 117, which is transmitted through links 119 and 120 to hinge the shoe 68. This upwardly hinging movement of the shoe 68 with the cutter-bar 69 is about the axis of the hinges 67, the shoe 68 and coupling arm 62 first rising to a substantially level position, as indicated in the dotted lines in Figure 3, until the coupling link 99, as indicated in Figure 4, abuts and is topped or gagged against the extension 28 of the gag-bar 23. When the coupling link 99 is thus stopped against the gag-bar extension 28, the further drawing in of the cable 106 is such as to cause the linkage 119 and 120 abruptly to hinge the shoe 68 about the pivot 67 to raise the cutter-bar to the vertical lift position shown in Figure 3. When the cutter-bar is thus raised to vertical position it may be temporarily securely held in such position by means of a stay-rod 129 for connecting the cutter-bar to the channel beam 108 in the same manner shown and described in the Pearson Patent 1,973,993. By disconnecting the stay-rod 129 and releasing the windlass, the cable may be let out once more to lower the cutter-bar to its normal cutting position on the ground. Lifting of the cutter-bar is enhanced by the counterbalance spring 79 heretofore described, in a manner well known in mowers of this type.

The mounting of the windlass unit is very substantial and conveniently locates the same with respect to the operator on his seat 11 and to one side thereof in such a manner that it will not interfere with the control and maneuvering of the tractor.

From this detailed description it will now be apparent that all of the desirable objects of the invention heretofore recited are attained. It is the intention to cover all such changes and modifications of the example of the invention herein shown and described which do not depart from the invention as indicated by the following claims.

What is claimed is:
1. The combination with a tractor having a transverse rear axle housing and a draw-bar at its rear end, of a support also at the rear end of the tractor connected with said axle housing and disposed below the draw-bar, a bracket carried on the support and connected with the draw-bar, a transverse gag-bar connected with the bracket and draw-bar, a mower connected to the support and including a vertically adjustable hinged cutter-bar disposed normally transversely of the tractor at its rear end, a coupling link connected between the cutter-bar and a fixed point adjacent the tractor, and means for adjustably raising the cutter bar, said link rising with the bar until it is stopped by the gag-bar, whereby the means for raising the cutter-bar is effective to cause final hinging of the bar to a substantially vertical position.

2. The combination with a tractor having a transverse rear axle housing and a draw-bar at its rear end, of a support also at the rear end of the tractor connected with said axle housing and disposed below the draw-bar, transversely spaced brackets supported on the support and connected with the draw-bar, a transverse gag-bar connected adjacent its ends with the respective brackets and intermediate its ends to the draw-bar, a mower connected to the support and including a vertically adjustable hinged cutter-bar disposed normally transversely of the tractor at its rear end, a coupling link connected between the cutter-bar and a fixed point adjacent the tractor, and means for adjustably raising the cutter-bar, said link rising with the bar until it is stopped by the gag-bar, whereby the means for raising the cutter bar is effective to cause final hinging of the bar to a substantially vertical position.

3. The combination with a tractor having a transverse rear axle housing and a draw-bar at its rear end, of a U-shaped support also at the rear end of the tractor and having its legs connected with said axle housing and disposed below the draw-bar, transversely aligned brackets supported on the respective legs of the support and connected with the draw-bar, a transverse gag-bar connected with the brackets and draw-bar, a mower connected to the support and including a vertically adjustable hinged cutter bar disposed normally transversely of the tractor at its rear end, a coupling link connected between the cutter-bar and a fixed point adjacent the tractor, said link being disposed below one end of the gag-bar, and means for adjustably raising the cutter bar, said link rising with the bar until it is stopped by the gag-bar, whereby the means for raising the cutter-bar is effective to cause final hinging of the bar to a substantially vertical position.

4. The combination with a tractor having a transverse rear axle housing and U-shaped draw-bar at its rear end, of a U-shaped support also at the rear end of the tractor having its legs connected with said axle housing and disposed below the draw-bar, transversely aligned up-right brackets supported on the respective legs of the support and connected at their upper ends with the draw-bar, a transverse gag-bar connected adjacent its ends with the brackets and intermediate its ends with the draw-bar, a mower connected to the support and including a vertically adjustable hinged cutter-bar disposed normally transversely of the tractor at its rear end, a coupling link connected between the cutter-bar and a fixed point adjacent the tractor, said link being disposed below one end of the gag-bar, and means for adjustably raising the cutter-bar, said link rising with the bar until it is stopped by the gag-bar, whereby the means for raising the cutter bar is effective to cause final hinging of the bar to a substantially vertical position.

5. The combination with a tractor having a transverse rear axle housing and a support also at the rear end of the tractor connected with said axle housing, brackets carried in transverse spaced relation on the support, a transverse gag-bar mounted on the brackets, of a mower connected to the support and including a vertically adjustable hinged cutter-bar disposed normally transversely of the tractor at its rear end, a coupling link connected between the cutter-bar and a fixed point adjacent the tractor, said link being disposed below one end of the gag-bar, and means for adjustably raising the cutter-bar, said link rising with the bar until it is stopped by the gag-bar, whereby the means for raising the cutter bar is effective to cause final hinging of the bar to a substantially vertical position.

6. The combination with a tractor having a transverse rear axle housing and a U-shaped support also at the rear end of the tractor including legs connected with said axle housing, transversely aligned brackets respectively carried on the legs of said support, a transverse gag-bar mounted on the brackets, of a mower connected to the support and including a vertically adjustable hinged cutter-bar disposed normally transversely of the tractor at its rear end, a coupling link connected between the cutter bar and a fixed point adjacent the tractor, said link being disposed below one end of the gag-bar, and means for adjustably raising the cutter-bar, said link rising with the bar until it is stopped by the gag-bar, whereby the means for raising the cutter-bar is effective to cause final hinging of the bar to a substantially vertical position.

7. The combination with a tractor having a transverse rear axle housing and a support also at the rear end of the tractor connected with said axle housing, a bracket supported on the support, a transverse gag-bar mounted on the bracket, of a mower connected to the support and including a vertically adjustable hinged cutter-bar disposed normally transversely of the tractor at its rear end, said bar having one end projected beyond one side of the support, a coupling link connected between the cutter-bar and a fixed point adjacent the tractor, said link being disposed below the projected end of the bar, and means for adjustably raising the cutter-bar, said link rising with the bar until it is stopped by the gag-bar, whereby the means for raising the cutter-bar is effective to cause final hinging of the bar to a substantially vertical position.

8. The combination with a wheel tractor having a body, a transverse rear axle housing, and a rear support connected thereto, of a mower attachment connected to the support including a coupling arm, a coupling yoke carried on the arm, a shoe and cutter-bar hingedly connected to the yoke, a standard carried on the axle housing, braces between the standard and body, a windlass including a cable, said windlass being carried on the standard, said cable being connected with linkage for raising the cutter bar and shoe about its hinge, and means for operating the windlass.

9. The combination with a wheel tractor having a body, a transverse rear axle housing, and a rear support connected thereto, a seat also carried on the rear end of the tractor, of a mower attachment connected to the support including a coupling arm, a coupling yoke carried on the arm, a shoe and cutter-bar hingedly connected to the yoke, a standard carried on the axle housing at one side of the seat, braces between the standard and body, a windlass including a cable, said windlass being carried on the standard, said cable being connected with linkage included in the mower attachment for raising the cutter-bar and shoe about its hinge, and means operable from the seat for operating the windlass.

10. The combination with a wheel tractor having a body, a transverse rear axle housing, and a rear support connected thereto, of a mower attachment connected to the support including a coupling arm, a coupling yoke carried on the arm, a shoe and cutter-bar hingedly connected to the yoke, a standard carried on the axle housing, braces between the standard and body, a windlass including a cable, said windlass being carried on the standard, a horizontal beam mounted on the standard and extending rearwardly over the mower attachment, means for bracing the beam to the standard, a pulley carried by the beam over which the cable passes, said cable being connected with linkage included in the mower attachment for raising the cutter-bar and shoe about its hinge, and means for operating the windlass.

11. The combination with a wheel tractor having a body carrying a seat, a transverse rear axle housing and a rear support connected thereto, of a mower attachment connected to the support including a coupling arm, a coupling yoke carried on the arm, a shoe and cutter-bar hingedly connected to the yoke, a standard carried on the axle housing, braces between the standard and body, a windlass including a cable, said windlass being carried on the standard, a horizontal beam mounted on the standard and rearwardly over the mower attachment, means for bracing the beam to the standard, a pulley carried by the beam over which the cable passes, said cable being connected with linkage included in the mower attachment for raising the cutter-bar and shoe about its hinge, and means operable from the seat for operating the windlass.

12. The combination with a wheel tractor having a body, a transverse rear axle housing and a rear support connected thereto, and a seat on the body at its rear end, of a mower attachment connected to the support including a coupling arm, a coupling yoke carried on the arm, a shoe and cutter-bar hingedly connected to the yoke, a standard carried on the axle housing, braces between the standard and body, linkage included in the mower attachment for raising the cutter-bar and shoe about its hinge, and manually operable means for operating the linkage, said means being carried on said standard in a position accessible to the tractor operator on the seat.

13. The combination with a tractor having a rearwardly extending power take-off shaft and a support below the shaft at the rear end of the tractor, a mower attachment mounted on said support including a normally transversely extending cutter-bar including a knife and pitman for reciprocating the knife, an upright sleeve including a box at its lower end mounted on the support, an upright shaft in the sleeve for driving from its lower end a bevel gear set within said box, a shaft extending from the box to drive a fly-wheel connected to operate the pitman, the upper end of the sleeve carrying a second gear box enclosing a bevel gear set for driving the upright shaft, and a shaft connection from the power take-off shaft for driving said last mentioned bevel gear set.

14. The combination with a tractor having a rearwardly extending power take-off shaft and a support below the shaft at the rear end of the tractor, a mower attachment mounted on said support including a normally transversely extending cutter-bar including a knife and pitman for reciprocating the knife, a vertical housing including an enlarged box at its lower end mounted on the support, a vertical shaft journaled in the sleeve for driving from its lower end a bevel gear set located within said box, a shaft journaled in the box and extending therefrom to drive and carry a fly-wheel connected to operate the pitman, the upper end of the sleeve carrying a second enlarged gear box enclosing a bevel gear set for driving the vertical shaft, and a shaft journaled in the second gear box and having connection with the power take-off shaft for driving said last mentioned bevel gear set.

15. The combination with a tractor having a rearwardly extending power take-off shaft and a support below the shaft at the rear end of the tractor, a mower attachment mounted on said support including a normally transversely extending cutter-bar including a knife and pitman for reciprocating the knife, an integral housing structure including an upright sleeve having a box at its lower end mounted on the support, an upright shaft journaled in the sleeve for driving from its lower end a bevel gear set within said box, a shaft journaled in and extending from the box to drive a fly-wheel connected to operate the pitman, the upper end of the housing structure including a second integral gear box enclosing a bevel gear set for driving the upright shaft, a shaft connection from the power take-off shaft for driving said last mentioned bevel gear set, said upper and lower gear boxes provided with openings to make the gears therein accessible, and covers for closing said openings.

SAMUEL E. HILBLOM.